US012265230B2

(12) United States Patent
Adema

(10) Patent No.: US 12,265,230 B2
(45) Date of Patent: Apr. 1, 2025

(54) MULTIPLE LASER LIGHT SOURCE SETS FOR SCANNING DISPLAY SYSTEMS

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 572 days.

(21) Appl. No.: 17/580,309

(22) Filed: Jan. 20, 2022

(65) Prior Publication Data

US 2022/0269094 A1 Aug. 25, 2022

Related U.S. Application Data

(60) Provisional application No. 63/140,527, filed on Jan. 22, 2021.

(51) Int. Cl.
| | |
|---|---|
| G02B 27/10 | (2006.01) |
| G02B 26/08 | (2006.01) |
| G02B 26/10 | (2006.01) |
| G02B 27/01 | (2006.01) |
| G02B 27/14 | (2006.01) |

(52) U.S. Cl.
CPC ....... *G02B 27/104* (2013.01); *G02B 26/0816* (2013.01); *G02B 26/101* (2013.01); *G02B 27/0172* (2013.01); *G02B 27/145* (2013.01); G02B 2027/0178 (2013.01)

(58) Field of Classification Search
CPC .. G02B 27/01; G02B 27/017; G02B 27/0101; G02B 27/0172; G02B 27/104; G02B 27/145; G02B 26/007; G02B 26/0816; G02B 26/0833; G02B 26/101
See application file for complete search history.

(56) References Cited

U.S. PATENT DOCUMENTS

| | | | |
|---|---|---|---|
| 2006/0087628 A1* | 4/2006 | Dvorkis | G03B 37/04 |
| | | | 353/121 |
| 2013/0100974 A1 | 4/2013 | Janssens et al. | |
| 2014/0078473 A1 | 3/2014 | Kusaka et al. | |
| 2014/0340585 A1* | 11/2014 | Heinzelmann | H04N 9/3129 |
| | | | 348/744 |
| 2015/0080745 A1* | 3/2015 | Wood | A61M 5/427 |
| | | | 600/479 |
| 2018/0129058 A1* | 5/2018 | Morrison | G02B 26/101 |
| 2018/0180251 A1* | 6/2018 | Tian | G03B 21/14 |
| 2018/0306723 A1* | 10/2018 | Ashrafi | G01N 33/49 |
| 2019/0064494 A1 | 2/2019 | Dyba | |
| 2019/0121140 A1* | 4/2019 | Dykaar | H01S 5/02208 |
| 2020/0174356 A1 | 6/2020 | Roberts et al. | |

* cited by examiner

*Primary Examiner* — Sultan Chowdhury

(57) ABSTRACT

An optical engine of a display system includes first and second sets of laser light sources, which may be independently controllable, with laser light from each set of laser light sources being respectively combined to form first and second elliptical laser light beams. The first and second elliptical laser light beams may propagate along parallel or angularly separated optical paths prior to incidence at a scan mirror of an optical scanner of the system. In some embodiments, the first and second elliptical laser light beams are incident on separate regions of the reflective surface of the scan mirror. In some embodiments, the first and second elliptical laser light beams are incident on partially overlapping regions of the reflective surface of the scan mirror.

18 Claims, 9 Drawing Sheets

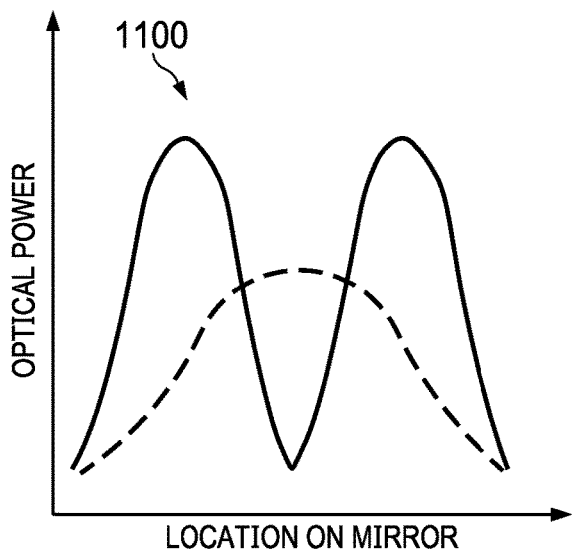
FIG. 11
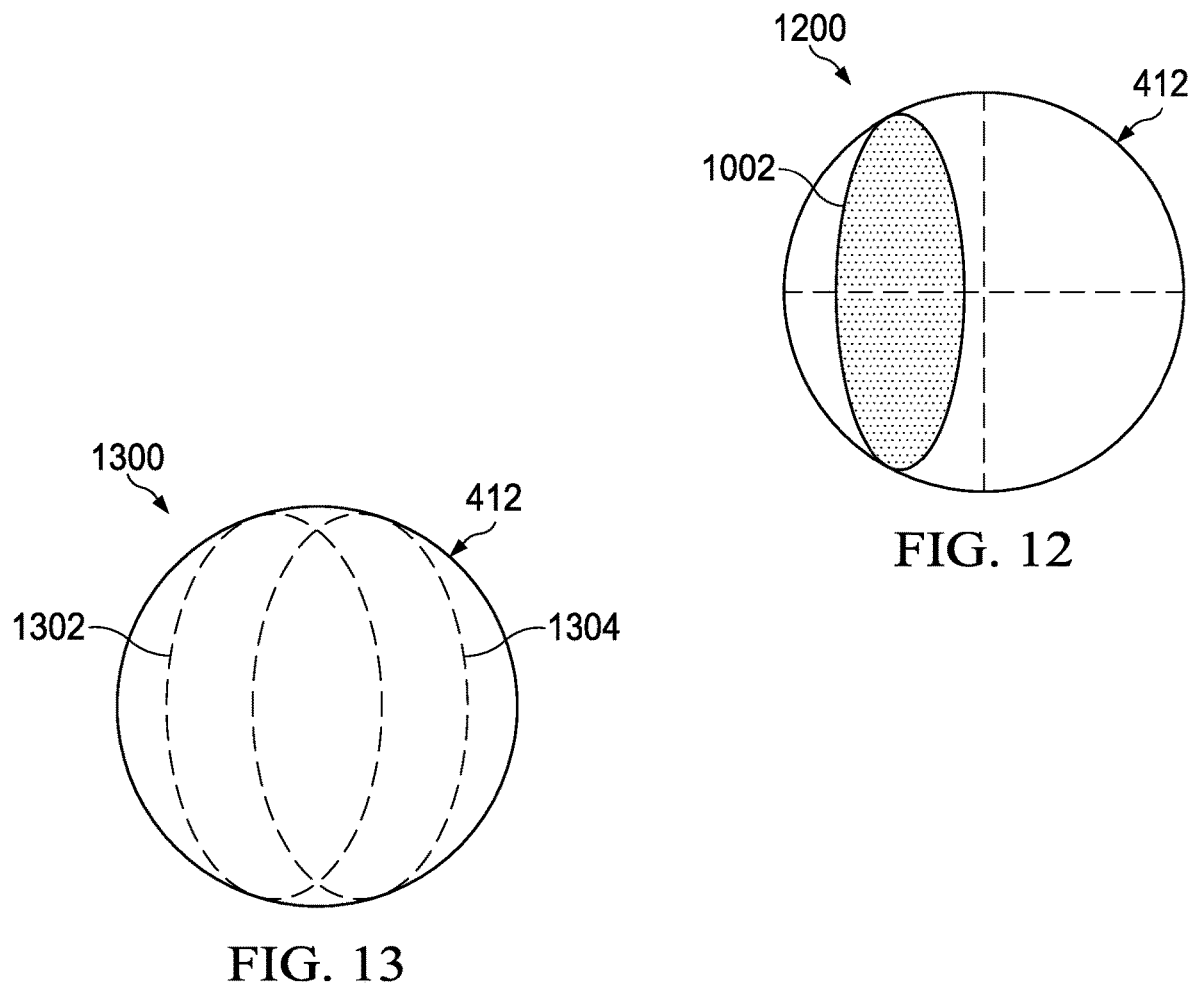
FIG. 12
FIG. 13

MULTIPLE LASER LIGHT SOURCE SETS FOR SCANNING DISPLAY SYSTEMS

CROSS-REFERENCE TO RELATED APPLICATIONS

The present application is related to and claims priority to the following co-pending application, the entirety of which is incorporated by reference herein: U.S. Provisional Patent Application Ser. No. 63/140,527, entitled "Multiple Laser Light Source Sets for Scanning Display Systems."

BACKGROUND

Some display systems employ a projector, which is an optical device that projects or shines a pattern of light onto another object (e.g., onto a surface of another object, such as onto a projection screen) in order to display an image or video on or via that other object. In projectors employing lasers as light sources (that is, in a "laser projector"), each laser of the laser projector is temporally modulated to provide a pattern of laser light and one or more controllable scan mirrors, such as digital micromirrors, are typically used to spatially distribute the modulated pattern of laser light over a two-dimensional area of another object. The spatial distribution of the modulated pattern of laser light produces an image at the other object. Typical laser projectors include scan mirrors with circular reflective surfaces (i.e., apertures).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 11 is a chart illustrating how the two parallel elliptical laser light beams of FIG. 10 allow more optical power to be passed by the scan mirror aperture than a single circularized light beam of comparable optical power, in accordance with some embodiments.

FIG. 12 is a diagram of the reflective surface of a scan mirror on which only one of two parallel elliptical laser light beams is incident, in accordance with some embodiments.

FIG. 13 is a diagram of the reflective surface of a scan mirror on which two non-parallel, angularly separated elliptical laser light beams is incident in overlapping regions, in accordance with some embodiments.

DETAILED DESCRIPTION

Embodiments described herein relate to display systems, such as scanning laser projection systems, that include an optical engine that generates and directs two elliptical laser light beams onto the reflective surface (which may be circular) of a scan mirror (e.g., a micro-electro-mechanical system (MEMS) mirror) of an optical scanner. It should be understood that, herein, an "elliptical laser light beam" refers to a laser light beam having a cross-sectional shape that is elliptical and non-circular. By having two elliptical laser light beams that are simultaneously incident on the reflective surface of the scan mirror, the total amount of laser light (in terms of both area and optical power) incident on the circular reflective surface is increased relative to arrangements in which only one elliptical laser light beam is incident on the circular reflective surface of the scan mirror.

FIGS. 1-13 illustrate embodiments of an example display system in which the optical engines and optical scanners of the present disclosure may be implemented. However, it will be appreciated that the apparatuses and techniques of the present disclosure is not limited to implementation to this particular display system, but instead may be implemented in any of a variety of display systems using the guidelines provided herein.

Figure 1:
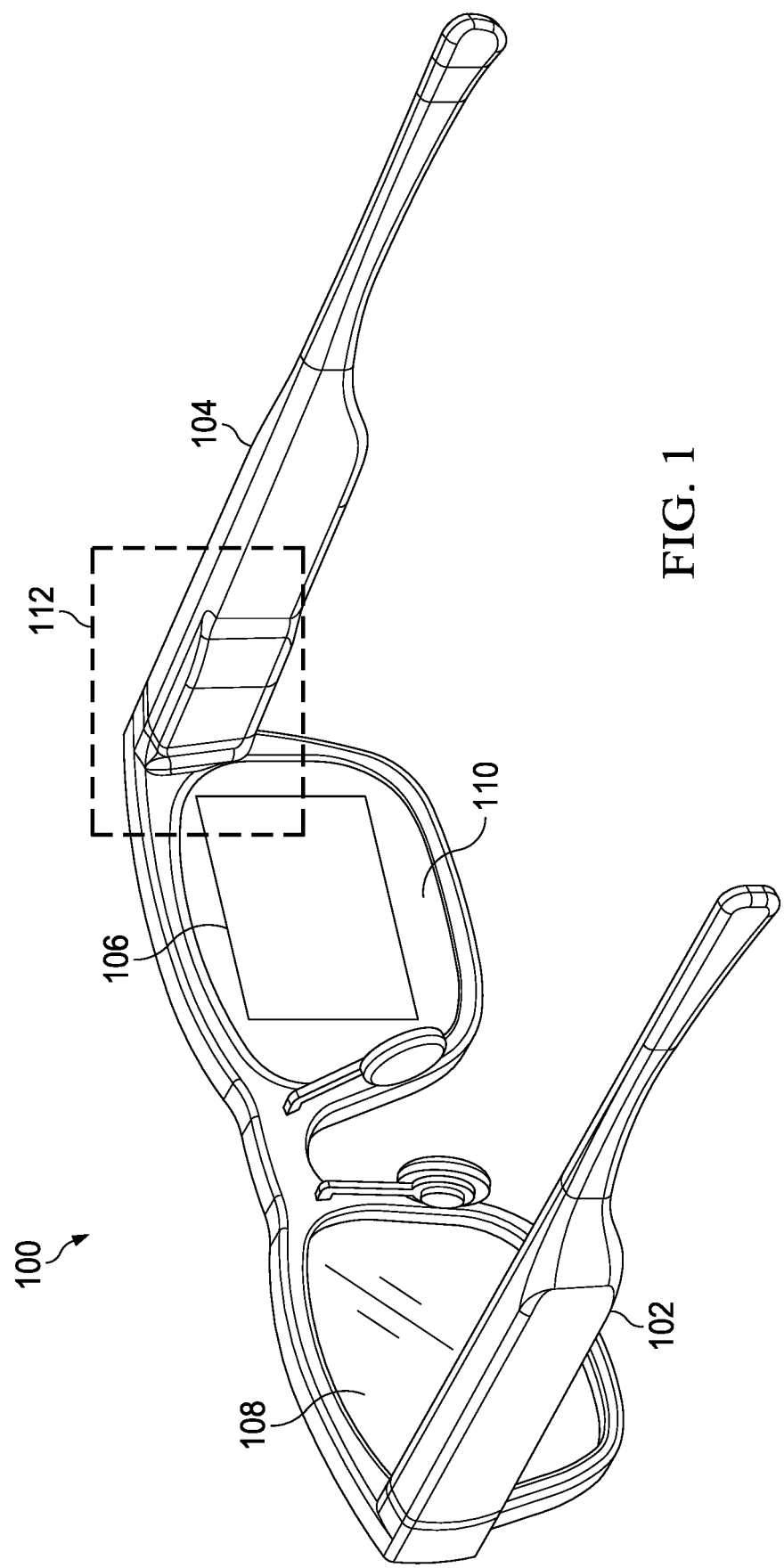
FIG. 1 is a diagram illustrating a display system having an integrated laser projection system, in accordance with some embodiments.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) system that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezobased). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
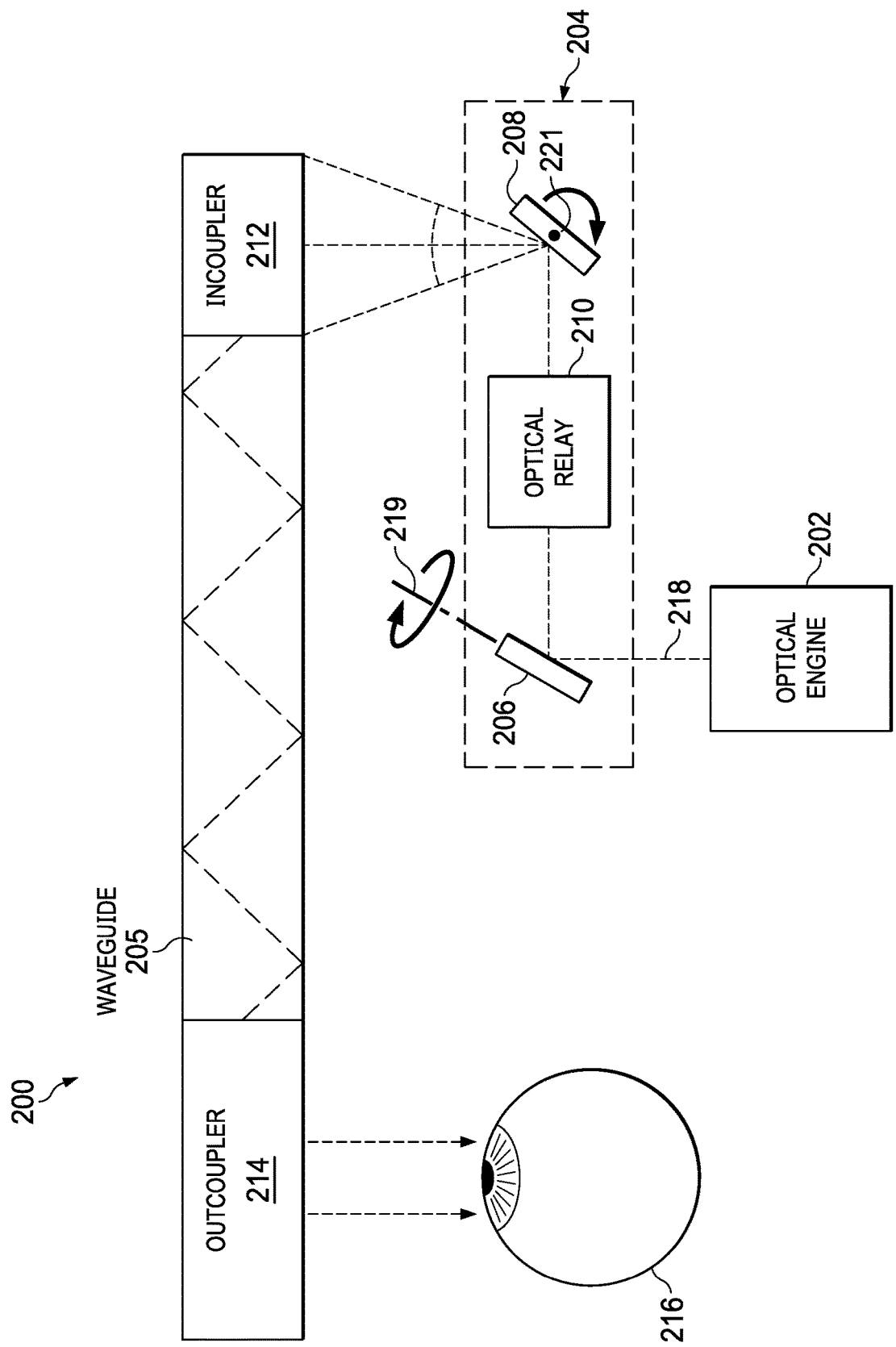
FIG. 2 is a diagram illustrating a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates or otherwise rotates around a first axis 219, such that the laser light 218 is scanned in only one dimension (i.e., in a line) across the surface of the second scan mirror 208. In some embodiments, the scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 in the first dimension to an exit pupil beyond the second scan mirror 208. Herein, an "exit pupil" in an optical system refers to the location along the optical path where beams of light intersect. For example, the possible optical paths of the laser light 218, following reflection by the first scan mirror 206, are initially spread along a first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture".

According to various embodiments, the optical relay 210 includes one or more spherical, aspheric, parabolic and/or freeform lenses that shape and direct the laser light 218 on the second scan mirror 208 or includes a molded reflective relay that includes one or more spherical, aspheric, parabolic, and/or freeform surfaces that shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes one or more edge-emitting lasers (EELs) that each emit a laser light beam having a substantially elliptical, non-circular cross-section. The elliptical laser light beams output by the optical engine 202 may be combined via a beam combiner into one or more combined elliptical laser light beams 218, which may be directed onto the first scan mirror 208 of the optical scanner 204. In some embodiments, the optical relay 210 magnifies or minimizes each laser light beam 218 along its semi-major or semi-minor axis to circularize each laser light beam 218 prior to convergence of the laser light beam(s) 218 on the second scan mirror 208. In some such embodiments, the surface of the mirror plate of the scan mirror 206 is circular. In some embodiments, the optical engine 202 outputs two elliptical laser light beams 218 that are both simultaneously incident on first and second regions of a circular reflective surface of the first scan mirror 206. The first and second regions may be non-overlapping or may be partially overlapping according to various embodiments.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is propagated to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). In some embodiments, a prism is used to steer light from the scan mirror 208 into the incoupler 212 so that light is coupled into incoupler 212 at the appropriate angles to encourage propagation of the light in waveguide 205 by TIR and/or to achieve the desired output angles at the outcoupler 214. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
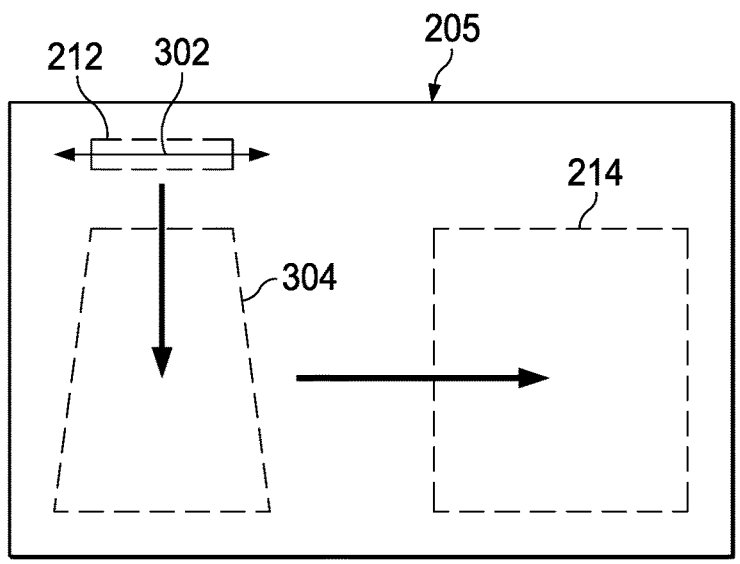
FIG. 3 is a diagram illustrating a waveguide having an incoupler, outcoupler, and exit pupil expander, in accordance with some embodiments.

FIG. 3 shows an example of light propagation within the waveguide 205 of the laser projection system 200 of FIG. 2 in accordance with some embodiments. As shown, light received via the incoupler 212, which is scanned along the axis 302, is directed into an exit pupil expander 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
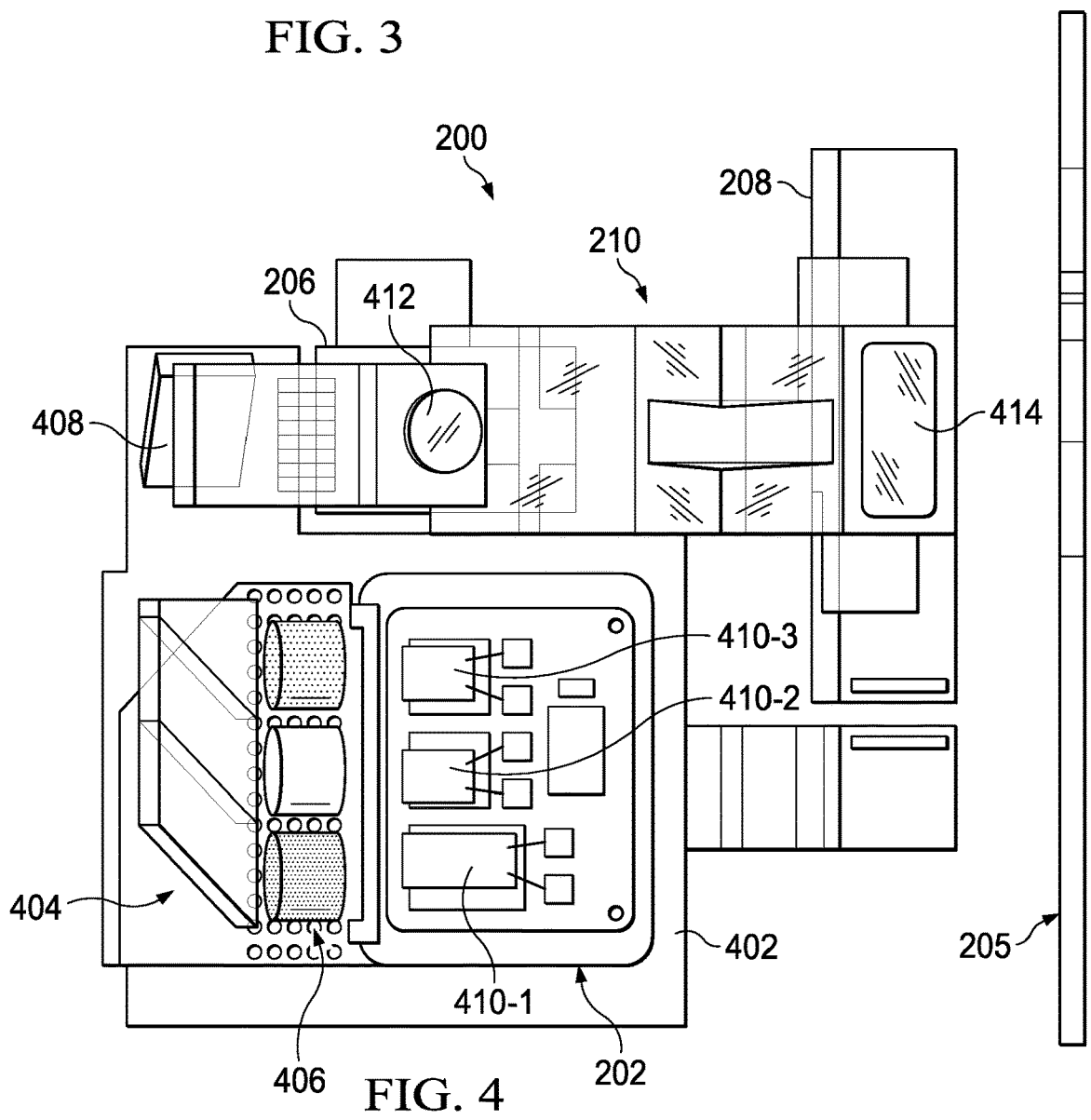
FIG. 4 is a diagram illustrating a laser projection system that includes a molded reflective relay disposed between two scan mirrors, in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimating lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the scan mirror 206. The scan mirror 206 scans the laser light 218 into the optical relay 210 across a first scanning axis.

In some embodiments, the optical engine 202 includes additional laser light sources that produce respective laser light beams that are also combined by the beam combiner 404, such that two laser light beams are output by the beam combiner 404 in parallel or with a non-parallel angular separation, and such that the two laser light beams are simultaneously incident on respective first and second regions of the reflective surface 412 of the scan mirror 206. The first and second regions may be non-overlapping or partially overlapping, according to various embodiments.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings, TIR surfaces, or metasurfaces. Such molding can simplify fabrication of the laser projection system 200 as it facilitates the incorporation of some or all of the optical surfaces of the relay into a single element, rather than several distinct, separate elements.

The optical relay 210 is configured to route the laser light 218 toward a reflective surface 414 of the scan mirror 208. The scan mirror 208 scans the laser light 218 across the incoupler (such as the incoupler 212) of the waveguide 205 along a second scanning axis. In some embodiments, the second scanning axis is perpendicular to the plane along which the laser light propagates through the optical relay 210.

Figure 5:
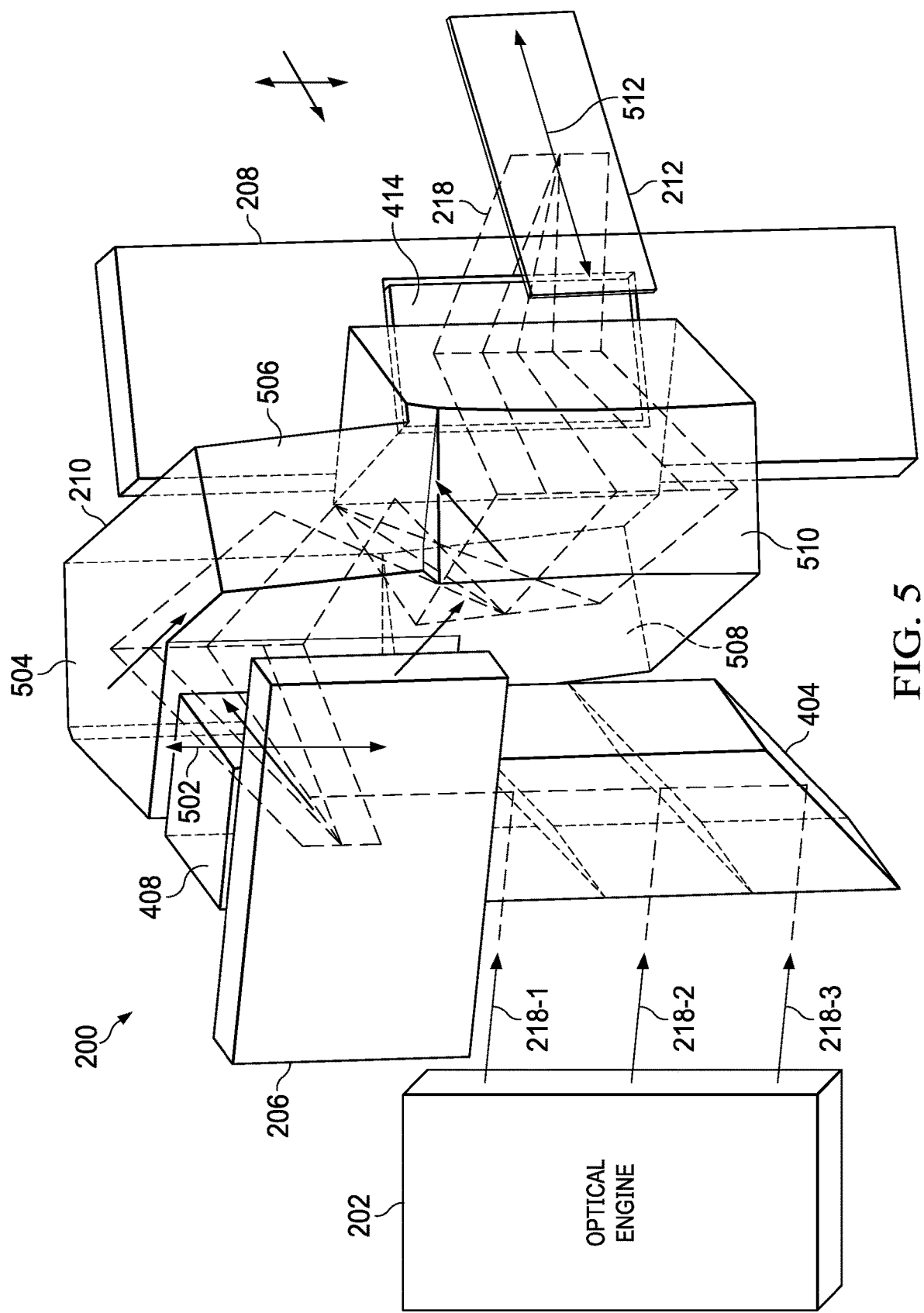
FIG. 5 is a diagram illustrating a laser projection system that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the scan mirror 206. The scan mirror 206 scans the laser light 218 along a first scanning axis 502 into the optical relay 210. The optical relay 210 reflects the laser light 218 off of reflective surfaces 504, 506, 508, and 510, then outputs the laser light 218 toward the reflective surface 414 of the scan mirror 208. The scan mirror 208 then scans the laser light 218 across the incoupler 212 along a second scanning axis 512, where the laser light 218 converges onto the incoupler 212 at most or all achievable scan angles of the scan mirror 206.

Figure 6:
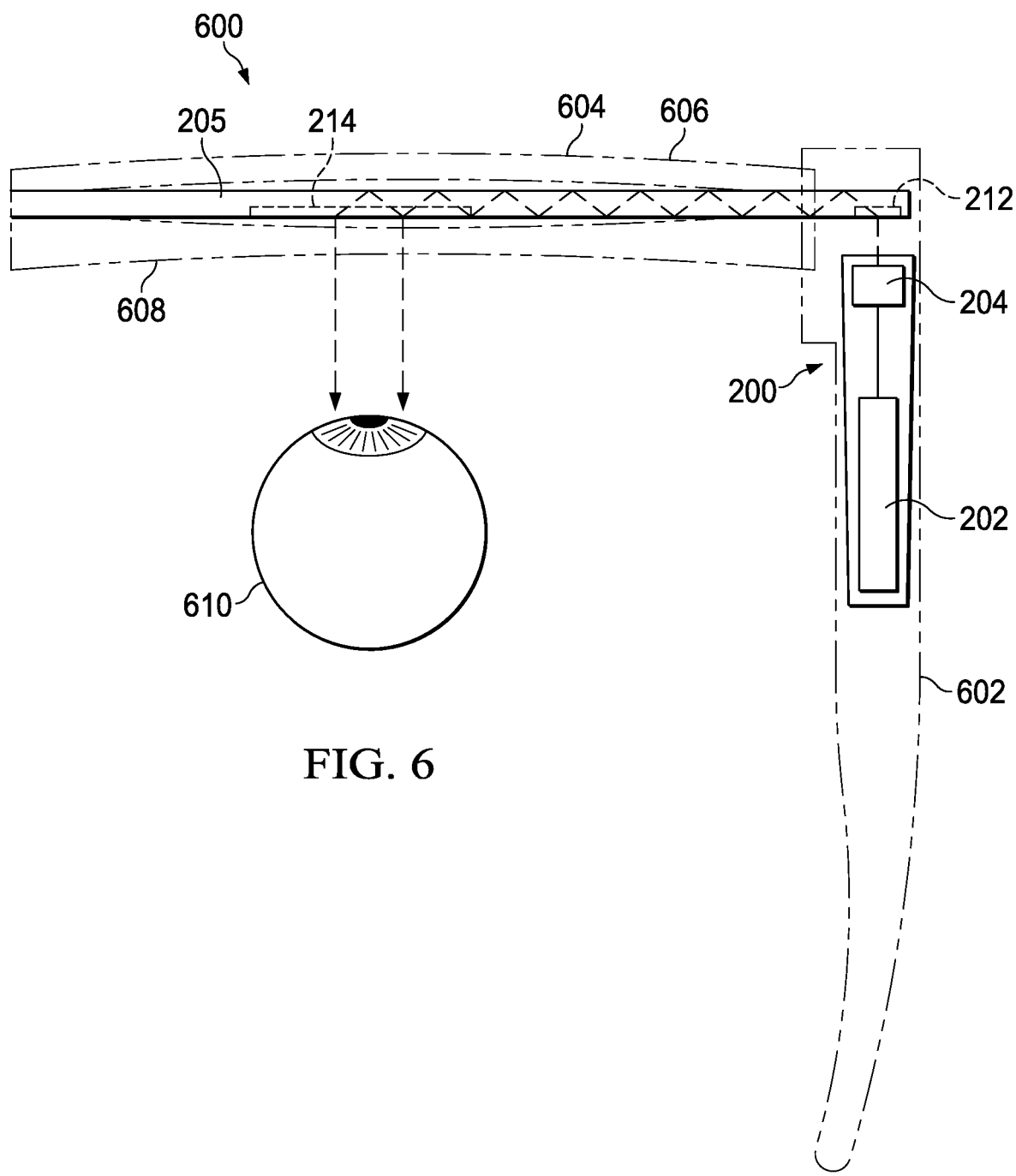
FIG. 6 is a diagram illustrating a partially transparent view of a wearable heads-up display (WHUD) that includes a laser projection system, in accordance with some embodiments.

FIG. 6 illustrates a portion of a WHUD 600 that includes the laser projection system 200 of FIG. 2. In some embodiments, the WHUD 600 represents the display system 100 of FIG. 1. The optical engine 202, the optical scanner 204, the incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projection system 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angles to encourage propagation of the light in waveguide 205 by TIR and/or to achieve the desired output angles at the outcoupler 214. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
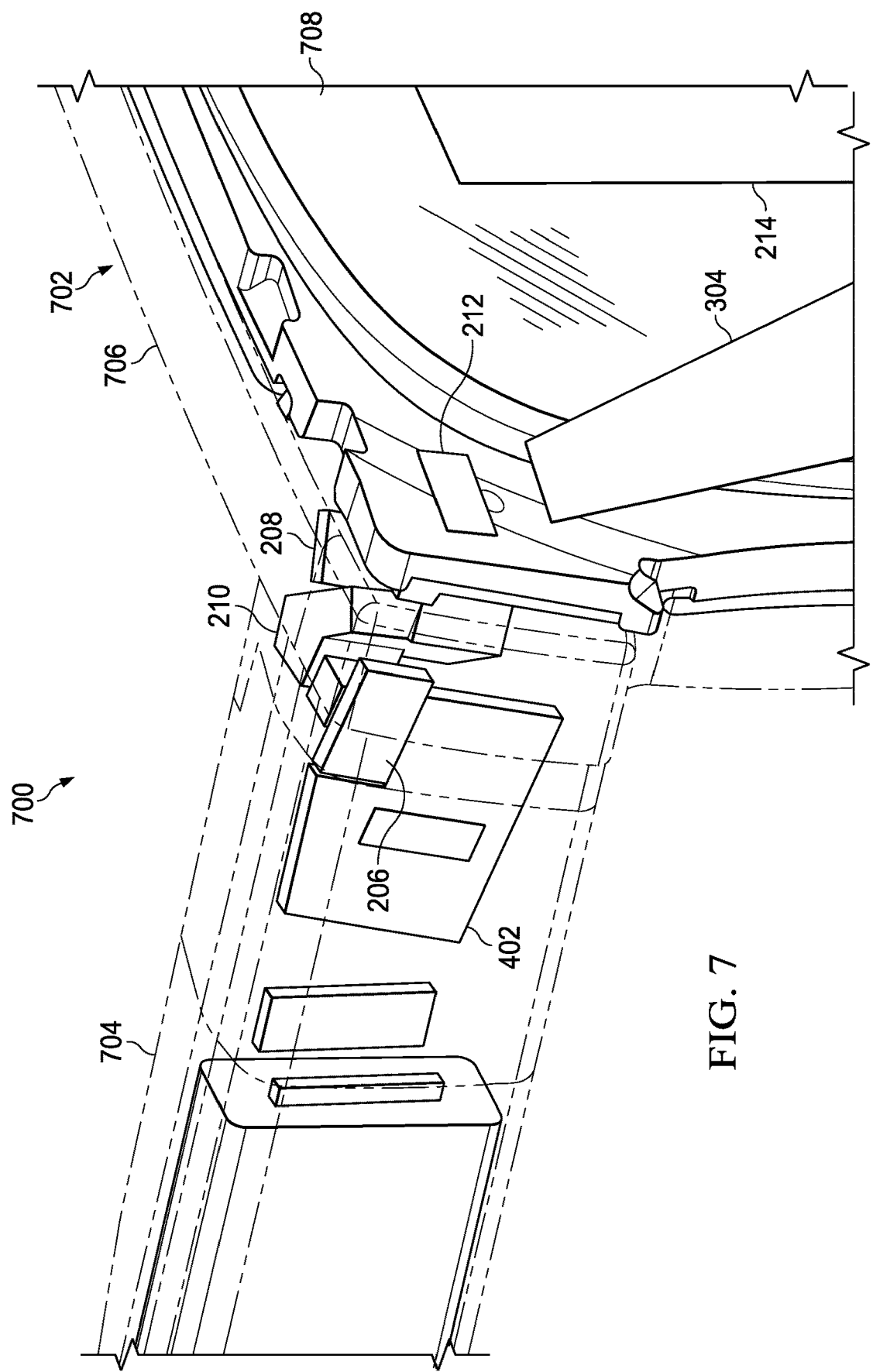
FIG. 7 is a diagram illustrating a partially transparent front isometric view of a laser projection system disposed within a WHUD, in accordance with some embodiments.
Figure 8:
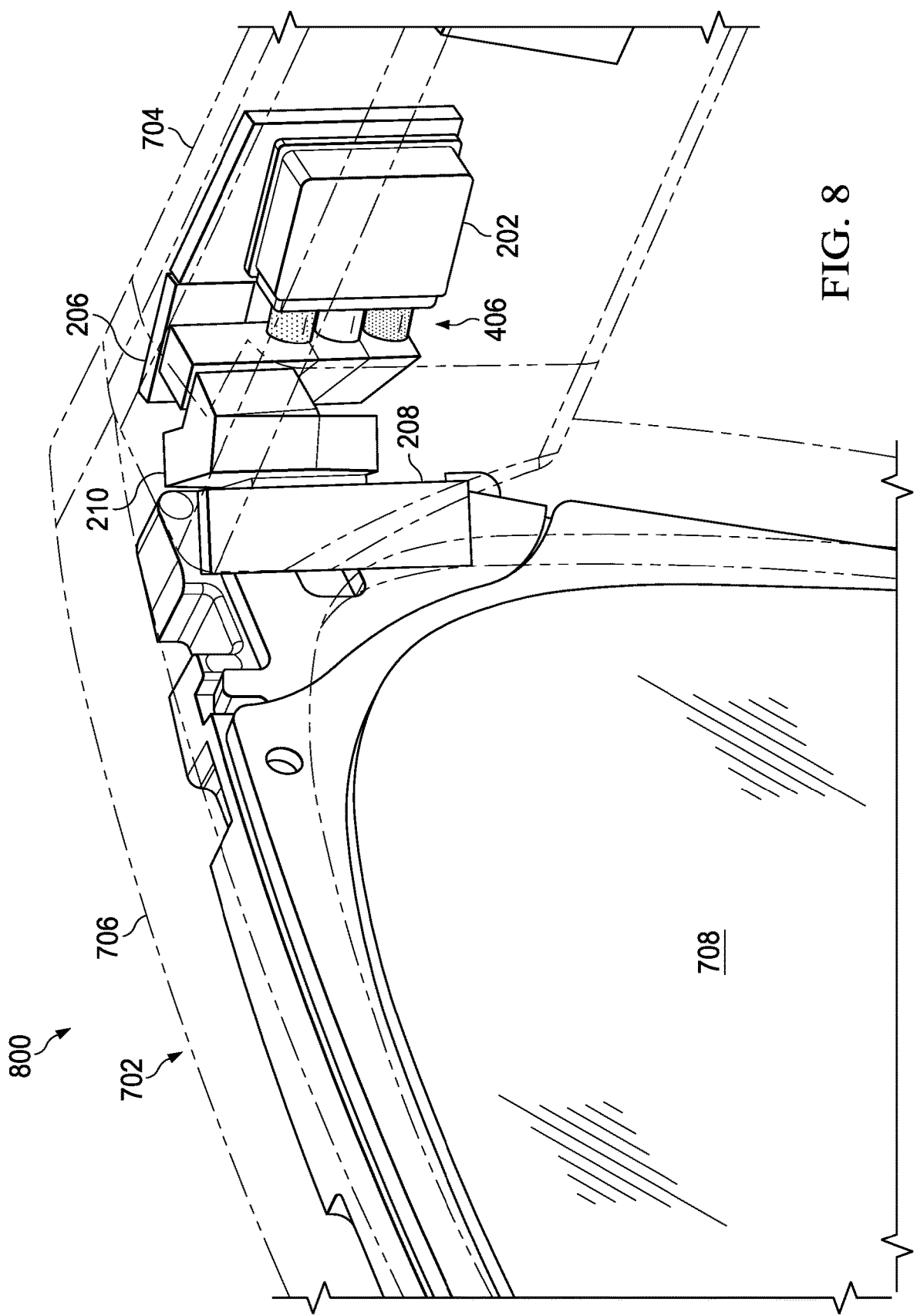
FIG. 8 is a diagram illustrating a partially transparent rear isometric view of a laser projection system disposed within a WHUD, in accordance with some embodiments.

FIGS. 7 and 8 show two different perspectives, partially transparent views 700 (FIG. 7) and 800 (FIG. 8) of a portion of a WHUD 702, which represents the WHUD 600 of FIG. 6 or the display system 100 of FIG. 1. The WHUD 702 includes an example arrangement of the laser projection system 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIG. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning axis, and the second scan mirror 208 oscillates or otherwise rotates to scan the laser light along a second scanning axis that is perpendicular to the first scanning axis. Laser light reflected by the second scan mirror 208 converges to a line at the incoupler 212. Laser light received at the incoupler 212 is routed to the outcoupler 214 via the waveguide 205. The light received at the outcoupler 214 is then directed out of the waveguide 205 (e.g., toward the eye of a user of the WHUD 702).

In scanning laser projection systems that utilize scan mirrors (e.g., scan mirrors 206 and 208 of FIG. 2), such as MEMS mirrors, the limiting aperture for the optical power (i.e., energy of the light) that can be output by the optical system is typically the size of the reflective surface of the scan mirror. Laser light beams generated by some types of lasers, such as edge emitting diode lasers, have non-circular elliptical cross-sections. Such elliptical laser light beams do not efficiently fill the aperture of a scan mirror having a circular reflective surface (e.g., reflective surface 412 of scan mirror 206 of FIG. 4). While techniques exist to reshape laser light beams to be circular to fill such circular apertures, this approach merely redistributes the optical power of the laser light beam across a wider area without actually increasing the amount of optical power passed by the aperture.

Figure 9:
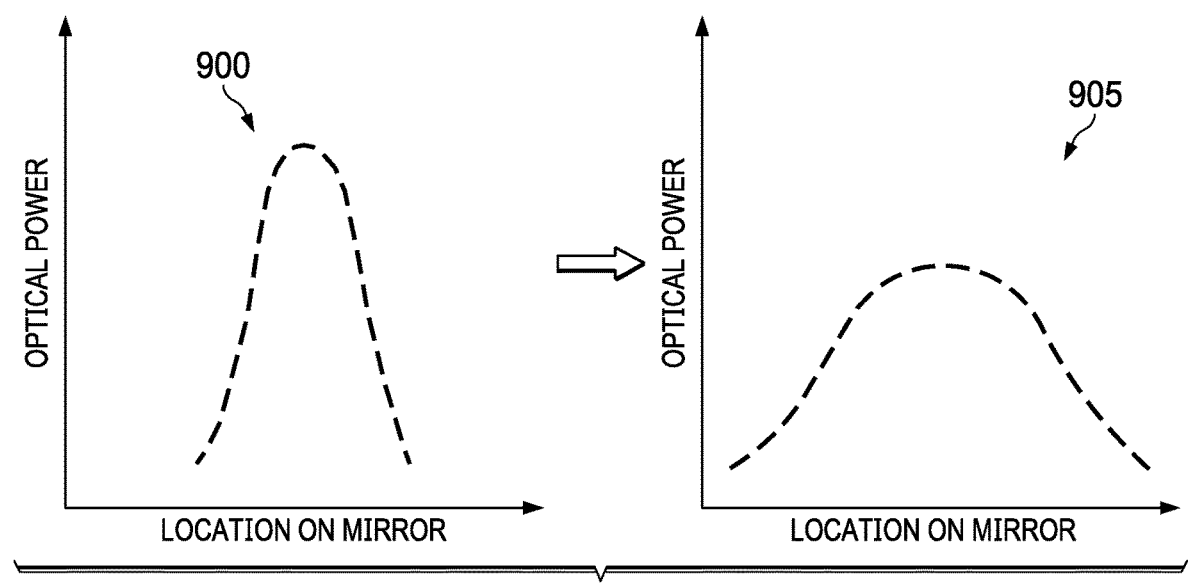
FIG. 9 is a chart showing optical power over the area of the reflective surface of a scan mirror, in accordance with some embodiments.

FIG. 9 shows charts 900, 905 of examples of optical power distributions of a laser light beam on the reflective surface of a scan mirror (e.g., the first scan mirror 206 of the optical scanner 204 of FIG. 4), with and without circularization prior to incidence on the reflective surface. In the present example, the chart 900 represents the optical power distribution at the reflective surface of the scan mirror for an elliptical laser light beam that has not been circularized prior to incidence on the reflective surface. The chart 905 represents the optical power distribution at the reflective surface of the scan mirror for the same laser light beam, where the laser light beam has first been circularized prior to incidence on the reflective surface. As shown, there is no increase in overall optical power passed by the aperture of the scan mirror, and the optical power of the laser light beam is instead redistributed over a wider area as a result of circularization prior to incidence.

In some embodiments, rather than directing only a single elliptical laser light beam onto the reflective surface of the first scan mirror of an optical scanner (e.g., optical scanner 204 of FIG. 4), an optical engine (e.g., optical engine 202 of FIG. 2) and corresponding optical elements (e.g., beam combiner 404 and primary mirrors 406 of FIG. 4) are configured to output two elliptical laser light beams onto the reflective surface of the first scan mirror.

Figure 10:
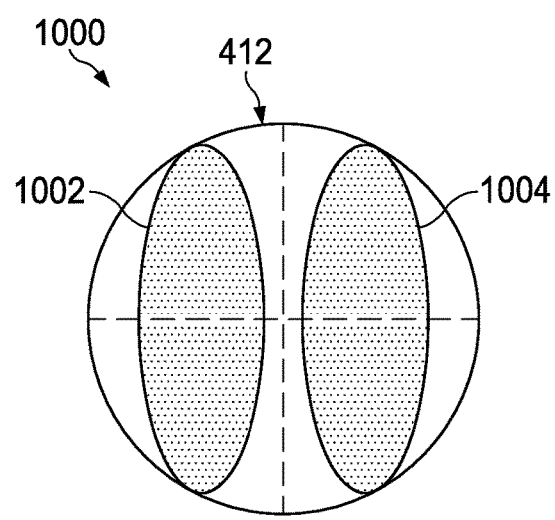
FIG. 10 is a diagram of the reflective surface of a scan mirror on which two parallel elliptical laser light beams are incident, in accordance with some embodiments.

FIG. 10 shows an illustrative example 1000 in which a pair of parallel elliptical laser light beams 1002, 1004 are incident on the first scan mirror 206. In the present example, the pair of parallel elliptical laser light beams 1002, 1004 approximate a circular laser light beam better than a single elliptical laser light beam, and the surface area of the circular reflective surface 412 of the first scan mirror 206 is filled more efficiently by the pair of elliptical laser light beams 1002, 1004 than it would be by a single elliptical laser light beam, for a single elliptical laser light beam having the same or a similar magnitude of optical power as that of only one of the parallel elliptical laser light beams shown in the present example.

FIG. 11 shows a chart 1100 illustrating how the two parallel elliptical laser light beams 1002, 1004 of FIG. 10 allow more optical power to be passed by the scan mirror aperture than a single circularized light beam (e.g., of similar optical power magnitude to one of the parallel elliptical laser light beams). The chart 1100 illustrates how the pair of parallel elliptical laser light beams 1002, 1004 covers much of the same area as a single circularized beam but provides more optical power. In some embodiments, the provision of two parallel elliptical laser light beams 1002, 1004 at the first scan mirror 206 of the optical scanner 204 of the system can eliminate the need for beam expansion optics to be included in the system.

In some embodiments, the parallel elliptical laser light beams 1002, 1004 provided by the optical engine 202 are of approximately equivalent power and are modulated such that both laser light beams are on at the same time. However, in some embodiments, a first set of laser light sources used to generate a first of the parallel elliptical laser light beams 1002, 1004 may have a different power level than a second set of laser light sources used to generate a second of the parallel elliptical laser light beams 1002, 1004. In some embodiments, the optical engine 202 may be configured to energize each of the first and second sets of laser light sources (e.g., adjacent diodes) independently, such that, at a given time during operation of the system, the optical engine may selectively energize the sets of laser light sources to output both, neither, or only one of the parallel elliptical laser light beams 1002, 1004 onto the first scan mirror 206. FIG. 12 shows an illustrative example 1200 in which only one of the pair of parallel elliptical laser light beams 1002, 1004 is incident on the reflective surface 412 of the first scan mirror 206 due to only one of the first and second sets of laser light sources being energized. By independently controlling the emission of each of the parallel elliptical laser light beams 1002, 1004, the lower end of the dynamic range of the display system may be expanded (e.g., such that lower brightness levels may be achieved by the display system), though with some impact on the display resolution.

The examples of FIGS. 10, 11, and 12 described above generally correspond to embodiments in which a pair of parallel elliptical laser light beams 1002, 1004 are incident on the first scan mirror 206. However, in some embodiments, the laser light beams incident at the first scan mirror may instead be non-parallel while still being angularly separated with respect to one another. FIG. 13 shows an illustrative example 1300 in which a pair of non-parallel, angularly separated elliptical laser light beams 1302, 1304 are incident on the first scan mirror 206. In the present example, the pair of non-parallel, angularly separated elliptical laser light beams 1302, 1304 travel along optical paths that are angled with respect to one another and are incident on the reflective surface 412 of the first scan mirror 206 at first and second regions that are partially overlapping (e.g., such that the incident beam profiles at the reflective surface of the first scan mirror are partially overlapping). As shown, the partially overlapping beam profiles of the non-parallel, angularly separated elliptical laser light beams 1302, 1304 approximate a circular cross-section at the reflective surface 412 of the first scan mirror 206 better than a single elliptical laser light beam, and the surface area of the circular reflective surface 412 of the first scan mirror 206 is filled more efficiently by the pair of elliptical laser light beams 1302, 1304 than it would be by a single elliptical laser light beam, for a single elliptical laser light beam having the same or a similar magnitude of optical power as that of only one of the parallel elliptical laser light beams shown in the present example. In some embodiments, the overlap of the incident beam profiles at the first scan mirror 206 in the present example may result in overlap of corresponding pixels output by the display system, though the magnitude of the overlap may depend on the angular separation between the two incident laser light beams.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A display system comprising:
    an optical engine comprising:
        a first set of laser light sources; and
        a second set of laser light sources;
        a beam combiner configured to combine a plurality of laser light beams output by the first set of laser light sources and the second set of laser light sources and to output a first elliptical laser light beam corresponding to the first set of laser light sources and a second elliptical laser light beam corresponding to the second set of laser light sources, wherein the first elliptical laser light beam propagates along a first optical path and the second elliptical laser light beam propagates along a second optical path that is different from the first optical path; and
        a scan mirror, wherein the first elliptical laser light beam and the second elliptical laser light beam are both directed onto the scan mirror.

2. The display system of claim 1, wherein the first elliptical laser light beam and the second elliptical laser light beam are both incident on the scan mirror simultaneously.

3. The display system of claim 1, wherein the optical engine is configured to energize the first set of laser light sources to cause the first elliptical laser light beam to be incident on the scan mirror while the second elliptical laser light beam is not incident on the scan mirror.

4. The display system of claim 1, wherein the first optical path is parallel to the second optical path.

5. The display system of claim 1, wherein the first optical path is angularly separated from the second optical path and is not parallel to the second optical path.

6. The display system of claim 1, wherein the first elliptical laser light beam is incident on the scan mirror in a first region, and the second elliptical laser light beam is incident on the scan mirror in a second region.

7. The display system of claim 6, wherein the first region is separate from the second region.

8. The display system of claim 6, wherein the first region at least partially overlaps the second region.

9. A method, comprising:
    combining a plurality of laser light beams output by a first set of laser light sources and a second set of laser light sources;
    outputting a first elliptical laser light beam corresponding to the first set of laser light sources and a second elliptical laser light beam corresponding to the second set of laser light sources, wherein the first elliptical laser light beam propagates along a first optical path and the second elliptical laser light beam propagates along a second optical path that is different from the first optical path; and
    directing the first elliptical laser light beam and the second elliptical laser light beam onto a scan mirror.

10. The method of claim 9, wherein the first elliptical laser light beam and the second elliptical laser light beam are both incident on the scan mirror simultaneously.

11. The method of claim 9, further comprising:
    energizing the first set of laser light sources to cause the first elliptical laser light beam to be incident on the scan mirror while the second elliptical laser light beam is not incident on the scan mirror.

12. The method of claim 9, wherein the first optical path is parallel to the second optical path.

13. The method of claim 9, wherein the first optical path is angularly separated from the second optical path and is not parallel to the second optical path.

14. The method of claim 9, wherein the first elliptical laser light beam is incident on the scan mirror in a first region, and the second elliptical laser light beam is incident on the scan mirror in a second region.

15. The method of claim 14, wherein the first region is separate from the second region.

16. The method of claim 14, wherein the first region at least partially overlaps the second region.

17. A wearable heads-up display system comprising:
    a beam combiner configured to:
        combine a plurality of laser light beams output by a first set of one or more laser light sources and a second set of one or more laser light sources;

output a first elliptical laser light beam corresponding to the first set of one or more laser light sources and a second elliptical laser light beam corresponding to the second set of one or more laser light sources, wherein the first elliptical laser light beam propagates along a first optical path and the second elliptical laser light beam propagates along a second optical path that is different from the first optical path; and direct the first elliptical laser light beam and the second elliptical laser light beam onto a first region and a second region of a scan mirror.

18. The wearable heads-up display system of claim 17, wherein the first region at least partially overlaps the second region.

* * * * *